United States Patent Office 3,411,530
Patented Nov. 19, 1968

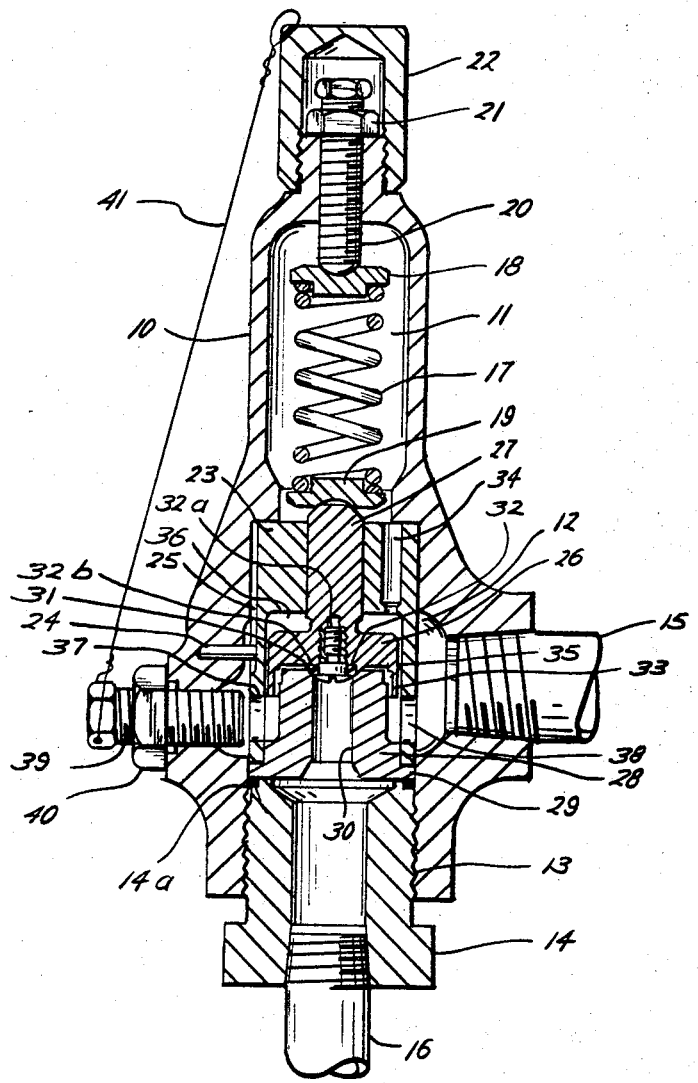

3,411,530
PRESSURE OPERATED POP VALVE
Walter W. Powell, Houston, Tex., assignor to Anderson, Greenwood & Co., Houston, Tex., a corporation of Texas
Filed July 6, 1965, Ser. No. 469,614
10 Claims. (Cl. 137—475)

ABSTRACT OF THE DISCLOSURE

This specification discloses a pressure responsive valve having a seat and a valve member adapted to move to and from the seat and includes at least one port through which fluids flowing through the valve must flow to be discharged from the valve and an adjustable control for the port to control blowdown of the valve. This abstract is neither intended to define the invention of the application which, of course, is measured by the claims, nor is it intended to be limiting as to the scope of the invention in any way.

---

The present invention relates to a pressure responsive relief valve having an adjustment for controlling the amount of blowdown.

Prior valves of this general type have been responsive to pressures in the systems which they are to protect against over pressure. They have included huddling chambers, and, in some of such valves, have included a structure similar to the present invention with the skirt on the valve member functioning to at least partially close the outlet ports to provide a snap-action movement of the valve member, both in opening and closing. In some of these prior devices an adjustable restriction has been placed in the outlet as a means of controlling the blowdown of the valve. The Irvin B. Weise application for Letters Patent entitled, "Pressure Operated Valve," Ser. No. 458,161 filed May 24, 1965, is an example of such prior devices. The device of the present invention is an improvement over the disclosure of the aforementioned application.

An object fo the present invention is to provide a pressure responsive relief valve having an adjustable means for controlling the back pressure and in consequence thereof the amount of blowdown of the valve.

Another object of the present invention is to provide a valve of the type described with adjustable means cooperating with an outlet port to control the back pressure in the valve and including a restricted passageway extending to the chamber above the valve member to delay the communication of the back pressure to such chamber.

A further object of the present invention is to provide a relief valve of the type described having a blowdown adjusting means which can be adjusted from the exterior of the valve body and such adjustment does not affect the capacity of the valve.

Still another object of the present invention is to provide an improved relief valve of the type described having an adjustable blowdown control and responding to pressures to open and close with a snap action.

These and other objects of the present invention are hereinafter more fully explained and discussed with reference to the drawings wherein:

The figure is a cross-sectional view of a relief valve constructed in accordance with the present invention.

The valve body 10 is provided with an upper bonnet chamber 11 and a lower valve chamber 12. The lower part of the valve chamber 12 is internally threaded at 13 to receive the bushing 14. Outlet 15 also extends through valve body 10 into communication with the valve chamber 12. The inlet 16 connects into bushing 14.

The spring 17 with spring washers 18 and 19 at each end thereof is positioned within bonnet chamber 11. Spring adjusting screw 20 extends through valve body 10 into bonnet chamber 11 and therein engages upper spring washer 18 to provide a means of adjusting the force exerted by the spring 17. Screw 20 is provided with the lock nut 21 and the exposed end of screw 20 is covered by the cap 22 which threadedly engages the valve body 10 and accomplishes a pressure seal through metal-to-metal contact.

The cage guide 23 is installed in the valve chamber 12 with the guide pin 24 in engagement with the orientation slot 25 on the exterior of cage guide 23. The movable valve member 26 is installed in cage guide 23 with its spindle 27 extending through cage guide 23 and engaging lower spring washer 19. The nozzle 28 is positioned partly within the cage guide 23. The lower, outwardly extending flange 29 on nozzle 28 is positioned in engagement between the lower edge of cage guide 23 and the inner portion of the bushing 14. With the bushing 14 threaded into the position shown, the cage guide 23 and the nozzle 28 are secured thereby in their desired positions within the valve chamber 12. The seal 14a prevents leakage either through the threads 13 or through the clearance between the flange 29 and the wall of the lower chamber 12.

The nozzle 28 has an internal bore 30, the upper end of which is surrounded by the seat 31. The valve member 26 has a plug portion 32 adapted to engage the seat 31 to close the passage through the valve from the inlet 16 to the outlet 15. Plug portion 32 may be any suitable plug to engage the seat 31 or, as shown, may include the removable plug held in place by the screw 32a engaging a coil-type lock within the valve member 26 to hold the resilient plug 32b in position. Valve member 26 is provided with a skirt 33 depending from its outer circumference. The skirt 33 extends downwardly around the upper part of nozzle 28 when the valve member 26 is seated as shown in the figure.

The cage guide 23 includes a pasasgeway 34 connecting the interior of the cage guide 23 with the bonnet chamber 11. The outside diameter of the skirt 33 is slightly smaller than the inside diameter of cage guide 23 to provide a restricted passage 35 communicating into the chamber 36 in cage guide 23 above the valve member 26. The ports 37 and 38 extend through cage guide 23. The blowdown adjusting screw 39 is threaded through the body 10 in alignment with the port 37 in cage guide 23. Lock nut 40 is used with adjusting screw 39 and the head thereof is safety wired as at 41 to the cap 22. A seal 39a is provided under the lock nut to prevent leakage through the threaded joint when the valve is relieving.

With the components of the device of the present invention being assembled as shown and described, the inlet 16 is connected to a system (not shown) which is to be protected against over pressure. The outlet 15 will be connected to a suitable vent or to the atmosphere at a safe location. The spring adjusting screw 20 is set to have the force necessary to hold the valve member 26 on the seat 31 until the pressure in the bore 30 exceeds the maximum pressure to be maintained in the system being protected. The adjusting screw 20 is locked in such position by tightening the lock nut 21.

Blowdown adjusting screw 39 is also adjusted with respect to port 37 to provide the desired degree of blowdown each time the valve member 26 is unseated.

In operation the system pressure is exerted through the inlet 16 and the bore 30 against the underside of valve member 26 on an area defined by the sealing of plug 32 on seat 31. The force of the system pressure tending to lift valve member 26 is resisted by the force of the spring 17. As the system pressure increases, the force resulting therefrom will overcome the force of the spring 17 and valve member 26 will move upwardly. As soon as plug 32 unseats from seat 31 the system pressure will be exerted on the valve member 26 over the larger area of the underside of valve member 26. Because the passage 35 is restricted, the pressure below the valve member 26 will be larger than the pressure thereabove, and the increased force resulting therefrom will move valve member 26 to the full open position in a snap action. When the valve member 26 reaches its upper position, the pressure fluid below valve member 26 will flow through passage 35 and passageway 34 and thus the pressure above and below valve member 26 will be equalized. However, the valve member 26 will not at such time close since the lifting force is added to by force from the fluid momentum being changed or caused to flow in the opposite direction and a pressure gradient from the underside of valve member 26 to the area below the skirt 23 of the valve member 26 since when the pressure above the valve member 26 has equalized with the pressure below the skirt 23, it will still be less than the pressure under the valve member 26 because of such pressure gradient.

The pressure below the valve member 26 and the pressure above the valve member 26 are controlled by the relationship in the areas of the valve seat 31 and the flow area available through ports 37 and 38. Port 38 may consist of one or more ports radially disposed about the cylindrical cage 23. Blowdown adjusting screw 39 controls the area of port 37. The ports 38 are sized in relation to the primary orifice of the valve so that during flow the pressure within the cage 23 surrounding the nozzle 28 below valve member 26 remains less than 50% of the system pressure within the bore 30, even though the port 37 is completely closed by the adjusting screw 39. With gases full flow capacity of the valve is maintained so long as the pressure ratio of the downstream pressure to the upstream pressure of the primary orifice remains below the critical pressure ratio for the particular gas. The critical pressure ratio is generally assumed to be 0.50 for most gases.

With the pressure above and below the valve member 26 equalized, the force from the pressure above adds to the force from the spring 17. As the system pressure in the bore 30 decreases from the relieving of pressure through the valve, a point will be reached at which the forces on the valve member become unbalanced and the valve member commences movement downward to close. This slight downward movement causes a reduction in the mass flow which reduces the pressure under the valve member 26 around nozzle 28 more than the normal pressure drop during flow conditions. Because of the restriction in the passage 35, the pressure above the valve member 26 will instantaneously be more than the pressure below which has been reduced by the initial movement of valve member 26. This unbalance of pressures on the valve member creates a force accelerating the member 26 downward to closed position whereby the closing of the valve member is also by a snap action.

The pressure at which the valve member closes is determined by the pressure above the valve member 26. This pressure above valve member 26 is controlled by the positioning of blowdown adjusting screw 39 to vary the combined flow area of the ports 37 and 38. The inward movement of screw 39 will restrict the port 37 causing the pressure within the cage guide 23 both above and below valve member 26 to increase. The greater pressure created in the bonnet chamber 11 will tend to offset a greater system pressure within the bore 30 since the remainder of the area of the valve member 26 will be approximately balanced by the pressures above and below being equal.

Thus, by increasing the restriction by inward movement of screw 39 at least partially closing port 37, the pressure in bonnet chamber 11 will be increased causing valve member 26 to close at a higher system pressure thereby reducing the amount of blowdown. The opposite result is accomplished by outward movement of screw 39 whereby the restriction of port 37 is reduced and reducing the pressures in cage guide 23 and bonnet chamber 11. Lower pressure in bonnet chamber 11 and above valve member 26 in guide 23 will cause the valve member 26 to remain open longer until the system pressure within the bore 30 has dropped to the point where it is overcome by the spring force and the force from the pressure in bonnet chamber 11.

From the foregoing it can be seen that the present invention provides an improved relief valve having an adjustable blowdown and using an adjustable restriction and a restricted passage to control the blowdown and in which the amount of the blowdown does not affect the preset relieving pressure of the relief valve.

What is claimed is:

1. A relief valve comprising,
a valve body defining an inlet and an outlet,
a valve seat positioned within said valve body between said inlet and said outlet,
a valve member coacting with said valve seat to close said valve seat and thereby shut off communication between said inlet and said outlet,
means urging said valve member into seated position on said valve seat,
said valve member being movable responsive to said urging means and to pressures on opposite sides of said valve member,
a cage surrounding said valve member and having at least one control port,
said control ports in said cage defining the sole communication to said outlet from the interior of said cage,
an adjustable flow control means coacting with one of said control ports to control the flow through said port to thereby create a back pressure within said cage, and
a passage providing communication between the space on the seat side of said valve member and the space on the opposite side of said valve member at all times,
said passage being restricted whereby changes of pressure on the seat side of said valve member are not immediately communicated to the space on the opposite side of said valve member.

2. A relief valve according to claim 1 wherein said adjustable flow control means comprises,
a threaded member extending through said valve body and having its inner end aligned with said control port in said cage whereby rotation of said threaded member will position said member with respect to said control port to control the restriction of said control port and thereby control the amount of blowdown of said relief valve.

3. A relief valve according to claim 2 including,
means locking the position of said threaded member with respect to said valve body.

4. A relief valve according to claim 1 including,
means orienting said cage within said valve body whereby said adjustable flow control means may coact with said control port to control the flow therethrough.

5. A relief valve according to claim 4 wherein:
said orienting means comprises a slot in the exterior of said cage and a pin positioned in said body and having one end thereof within said slot in said cage whereby said control port is held in coacting position with respect to said flow control means.

6. A relief valve comprising,
a valve body defining an inlet and an outlet,
a valve seat positioned within said valve body between said inlet and said outlet,
a valve member coacting with said valve seat to close said valve seat and thereby shut off communication between said inlet and said outlet, means urging said valve member into seated position on said valve seat, said valve member being movable responsive to said urging means and to pressures on opposite sides of said valve member, said valve member having a central seating plug and an outer annular depending skirt, a cage surrounding said valve member and defining a plurality of control ports, said control ports in said cage defining the sole communication to said outlet from the interior of said cage, an adjustable flow control means coacting with one of said control ports to control the flow through said one of said ports to thereby create a back pressure within said cage, said skirt being spaced slightly from said cage to provide a restricted passage therebetween whereby back pressure created within said cage bleeds through said restricted passage to the space on the side of said valve member opposite said seating plug urging said valve member toward closed position on said valve seat to control the amount of blowdown of said valve.

7. A relief valve according to claim 6 wherein said adjustable flow control means comprises, a threaded member extending through said valve body and having its inner end aligned with said control port in said cage whereby rotation of said threaded member will position said member with respect to said control port to control the restriction of said control port and thereby control the amount of blowdown of said relief valve.

8. A relief valve according to claim 6 including, means orienting said cage within said valve body whereby said adjustable flow control means may coact with said control port to control the flow therethrough.

9. A relief valve comprising, a housing having an inlet and an outlet, a seat positioned within said housing between said inlet and said outlet, a valve member coacting with said seat to shut off communication between said inlet and said outlet, means urging said valve member into seated position on said valve seat, said valve member being movable responsive to said urging means and to pressures on opposite sides of said valve member, a passage providing communication between the space on the seat side of said valve member and the space on the opposite side of said valve member at all times, said passage being restricted whereby changes of pressure on the seated side of said valve member are not immediately communicated to the space on the opposite side of said valve member, a cage surrounding said valve member and defining at least two control ports, said control ports in said cage defining the sole communication to said outlet from the interior of said cage, and an adjustable flow control means coacting with one of said control ports to restrict the flow through said port to thereby control the back pressure existing within said housing on the side of said valve member opposite said valve seat while the valve is open and flowing to thereby control the amount of blowdown of said relief valve.

10. A relief valve according to claim 9 wherein said adjustable flow control means comprises, a threaded member extending through said housing and having its inner end coacting with said control port whereby rotation of said threaded member will vary the degree of restriction of said control port to thereby control the pressure within the controlled area at which said valve member will close.

References Cited

UNITED STATES PATENTS

| | | | |
|---|---|---|---|
| 2,510,617 | 6/1950 | Barr | 137—599 |
| 769,512 | 9/1904 | Tippett | 137—475 |
| 921,360 | 5/1909 | Caset | 137—475 X |
| 2,277,656 | 3/1942 | Falls | 137—478 |
| 2,597,057 | 5/1952 | Bergquist | 137—470 |
| 2,880,751 | 4/1959 | Tobis | 137—478 |
| 3,027,911 | 4/1962 | Gilmore | 137—469 |
| 3,074,425 | 1/1963 | Kikendall | 137—477 |
| 3,298,385 | 1/1967 | Jackson | 137—112 |

WILLIAM F. O'DEA, *Primary Examiner.*

HAROLD W. WEAKLEY, *Assistant Examiner.*